United States Patent
Thomas

[19]

[11] Patent Number: 6,102,446
[45] Date of Patent: Aug. 15, 2000

[54] POLYGONAL FLEXIBLE METAL HOSE COUPLING ASSEMBLY

[75] Inventor: R. Winfield Thomas, West Lebanon, Ind.

[73] Assignee: Tru-Flex Metal Hose Corporation, West Lebanon, Ind.

[21] Appl. No.: 09/245,697

[22] Filed: Feb. 6, 1999

[51] Int. Cl.[7] ...................................................... E21B 19/10
[52] U.S. Cl. .................... 285/148.19; 285/420; 285/252; 285/148.24; 285/148.26; 24/23 R
[58] Field of Search ................................ 24/23 R, 20 CW, 24/20 EE, 23 EE, 278, 279; 285/419, 420, 252, 253, 236, 148.18, 148.19, 148.22, 148.23, 148.24, 148.26, 92

[56] References Cited

U.S. PATENT DOCUMENTS

| | | |
|---|---|---|
| 925,317 | 6/1909 | Eldred . |
| 1,913,390 | 6/1933 | Hungerford . |
| 2,420,153 | 5/1947 | Sprenger et al. . |
| 3,623,513 | 11/1971 | Dinkelkamp . |
| 3,905,623 | 9/1975 | Cassel . |
| 4,113,289 | 9/1978 | Wagner et al. . |
| 4,312,526 | 1/1982 | Cassel . |
| 4,629,226 | 12/1986 | Cassel et al. . |
| 5,222,288 | 6/1993 | Thomas . |
| 5,228,479 | 7/1993 | Thomas . |
| 5,362,113 | 11/1994 | Thomas . |

*Primary Examiner*—Eric K. Nicholson
*Attorney, Agent, or Firm*—Shughart Thomson & Kilroy P.C.; Mark E. Brown

[57] ABSTRACT

A polygonal flexible metal hose coupling assembly for connecting first and second pipes of a vehicle exhaust system includes a polygonal coupling body. The coupling body is formed by spiral-winding a metal strip with interlocking leading and trailing edges. The polygonal configuration of the coupling body prevents the strip turns or windings from sliding with respect to each other along their interlocked seams. A pair of clamps are provided for connecting the coupling body ends to the pipe ends. Each clamp includes an annular band with a first section having a generally round cross-sectional configuration for receiving a pipe end and a second section with a polygonal cross-sectional configuration for receiving a coupling body end.

11 Claims, 2 Drawing Sheets

POLYGONAL FLEXIBLE METAL HOSE COUPLING ASSEMBLY

BACKGROUND OF THE INVENTION

1. Field of the Invention.

The present invention relates generally to pipe and hose couplings, and in particular to a polygonal, flexible metal hose coupling assembly.

2. Description of the Prior Art.

Various types of hoses and pipes are used for conveying fluids and bulk materials in a wide variety of applications. Many installations require coupling a pair of pipes. In many cases it is desirable to provide a measure of isolation between the connected pipes. For example, in vehicle exhaust systems such isolation is sometimes necessary to absorb vibration and allow relative movement between a pair of exhaust system components.

Spiral-wound, flexible metal hose is often utilized for this purpose. Such hose tends to be relatively leak-resistant and have sufficient flexibility to accommodate relative movement between a pair of pipes which have been connected.

A problem with previous spiral-wound flexible metal hose couplings relates to the tendency of the couplings to expand and contract under thermal and vibration loads. For example, the interlocked seams of the metal strip tend to allow a certain amount of slippage. Such slippage can result in the flexible hose coupling body loosing its flexibility and thus becoming susceptible to breakage as a result of operating stresses. To resist strip slippage along the edge seams, polygonal hose sections have been fabricated with the multi-sided, polygonal configurations thereof resisting such slippage. However, heretofore there has not been available a clamp for effectively connecting such polygonal hose to standard round pipe sections with the advantages and features of the present invention.

SUMMARY OF THE INVENTION

In the practice of the present invention, a polygonal flexible metal hose coupling assembly is adapted for connecting the ends of first and second pipes in a vehicle exhaust system. The coupling assembly includes a coupling body formed by spiral-winding a metal strip with interlocked leading and trailing strip edges to provide flexibility. The coupling body is wound with multiple, flat, radially-spaced, longitudinally-extending sides to provide a polygonal or multi-sided configuration. A pair of clamps are provided for connecting the coupling body ends to the pipe ends. Each clamp includes an annular band with a first section having a round cross-sectional configuration for accommodating a pipe end and a second section having a polygonal cross-sectional configuration corresponding to the coupling body.

OBJECTS AND ADVANTAGES OF THE INVENTION

The principal objects and advantages of the present invention include: providing a coupling assembly for pipes; providing such a coupling assembly with a spiral-wound coupling body; providing such a coupling assembly wherein the coupling body has a polygonal cross-sectional configuration; providing such a coupling system wherein the coupling body resists tightening and expansion of a coupling body bore extending therethrough; providing such a coupling assembly which maintains its flexibility; providing such a coupling assembly which reduces the stiffening effects of carbonization; providing such a coupling assembly with a coupling body which can be manufactured with different numbers of sides; providing such a coupling assembly which utilizes a clamp design having a first section with a round cross-sectional configuration for accommodating a pipe and a second section with a polygonal cross-sectional configuration for accommodating the polygonal coupling body; providing such a coupling assembly which provides a substantially fluid-tight seal by employing clamps with different configurations for sealingly coupling pipes and polygonal coupling bodies; and providing such a coupling assembly which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

I. Introduction and Environment

Figure 1:
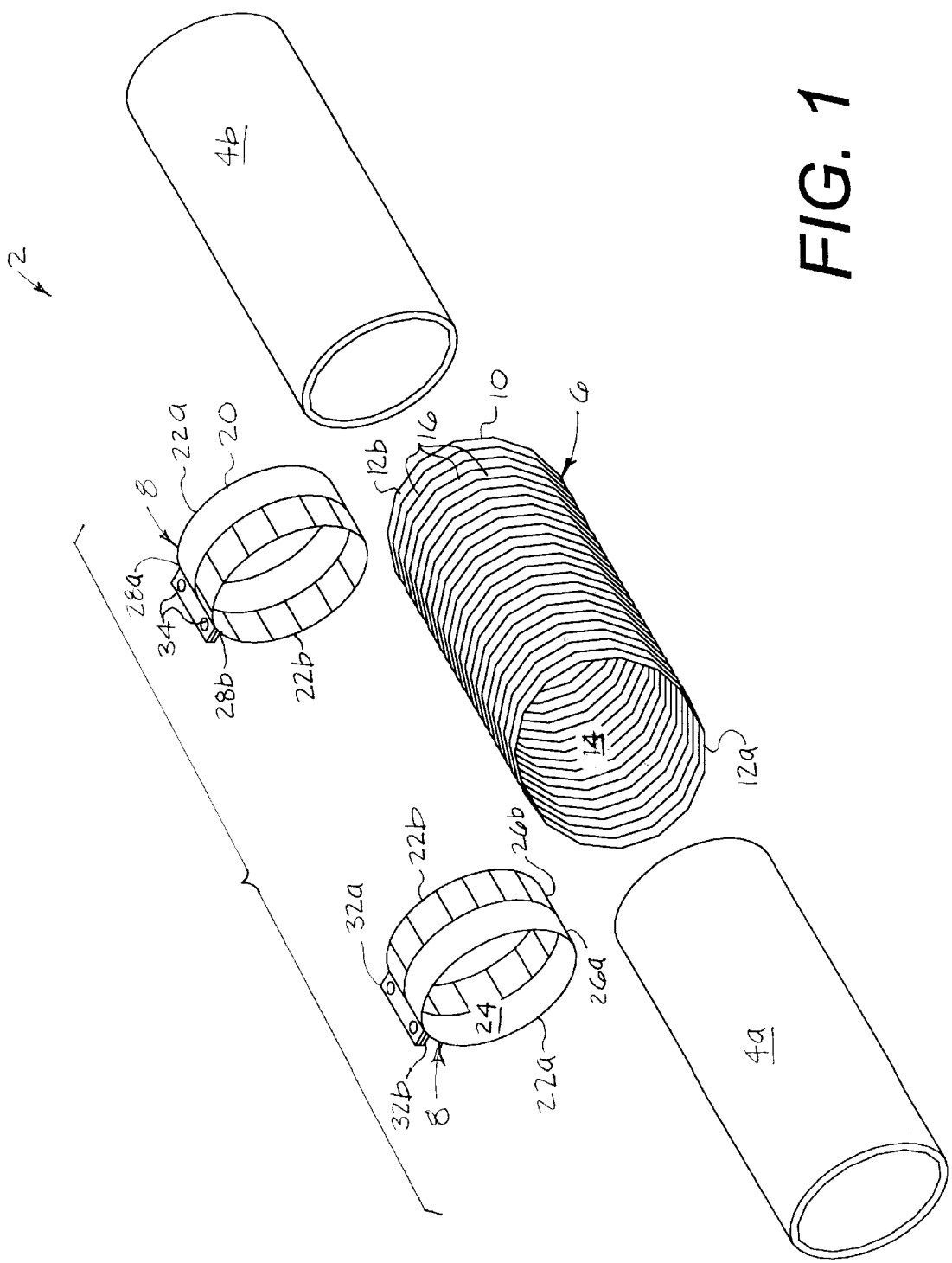
FIG. 1 is an exploded perspective view of a polygonal flexible metal hose coupling assembly embodying the present invention and shown with a pair of pipes adapted for coupling by the coupling assembly.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference number 2, generally designates a polygonal flexible metal hose coupling assembly embodying the present invention.

Without limitation on the generality of useful applications of the coupling assembly 2, it is shown coupling first and second pipes 4a,b which can comprise, for example, exhaust system components such as an exhaust pipe and a tail pipe. The pipes 4a,b shown have generally circular cross-sectional configurations, although the useful applications of the coupling system 2 embodying the present invention are not limited to pipes with circular configurations.

The coupling assembly 2 generally comprises a spiral-wound, flexible metal hose coupling 6 and a pair of clamps 8.

II. Coupling 6

The coupling 6 comprises a spiral-wound metal strip 10 with interlocking leading and trailing edges. The coupling 6 includes first and second ends 12a,b and a coupling bore 14 extending between the ends 12 and open thereat.

The technique for interlocking the leading and trailing edges of a spiral-wound metal strip is well known in the art.

For example, U.S. Pat. No. 925,317; Nos. 1,913,390 and 2,240,153 disclose this technique and are incorporated herein by reference. The interlocked leading and trailing edges of the strip 10 permit a limited amount of flexure, expansion and contraction of the coupling 6. The strip 10 is formed to provide a multi-sided (polygonal) cross-sectional configuration whereby the coupling 6 comprises a plurality of longitudinally-extending, juxtaposed, radially-spaced, relatively flat sides 16.

III. Clamps 8

Each clamp 8 includes an annular clamp band 20 forming first and second rims 22a,b. A clamp receiver 24 extends between and is open at the rims 22a,b. The band 20 includes a first section 26a with a generally circular cross-sectional configuration and a second section 26b with a generally polygonal cross-sectional configuration. The first and second band sections 26a,b are located adjacent to the first and second band rims 22a,b respectively.

The band 20 includes first and second ends 28a,b which mount a connector subassembly 30 adapted for selectively expanding and contracting the clamp 8 for respectively clamping and releasing the pipes 4a,b and the coupling ends 12a,b. The connector subassembly 30 includes first and second plates 32a,b attached to the band ends 28a,b respectively. The plates 32 are adjustably secured together by suitable mechanical fasteners 34, such as nut-and-bolt combinations.

IV. Operation

Without limitation on the generality of useful applications of the coupling assembly 2, the polygonal configurations of its components can be advantageously employed in harsh environments, such as vehicle exhaust systems. The components of vehicle exhaust systems are typically subjected to extreme heat and cold, continuous vibration and corrosive, high-temperature exhaust gases. The multi-sided (polygonal) configuration of the coupling body 6 resists longitudinal slippage of adjacent turns or windings of the strip 10. Thus, regardless of the forces to which the coupling assembly 2 is subjected, the turns of the strip 10 tend to remain in their original, factory locations with respect to each other and thus accommodate slight transverse movement whereby the coupling body 6 retains its flexibility.

The dual configuration of the clamps 8 accommodates both the round cross-sectional configuration of the pipes 4a,b and the polygonal configuration of the coupling body 6. Relatively fluid-tight seals are thus achieved at both ends 12a,b of the coupling 6.

It will be appreciated that the coupling assembly 2 could comprise a wide variety of materials chosen for such properties such as corrosion resistance, ductility, etc. For example, the coupling body 6 can comprise stainless steel, aluminum or various alloys. The clamps 8 could likewise be fabricated from various suitable materials. The coupling body 6 can also be provided with various liners, sleeves, insulation, etc.

Figure 2:
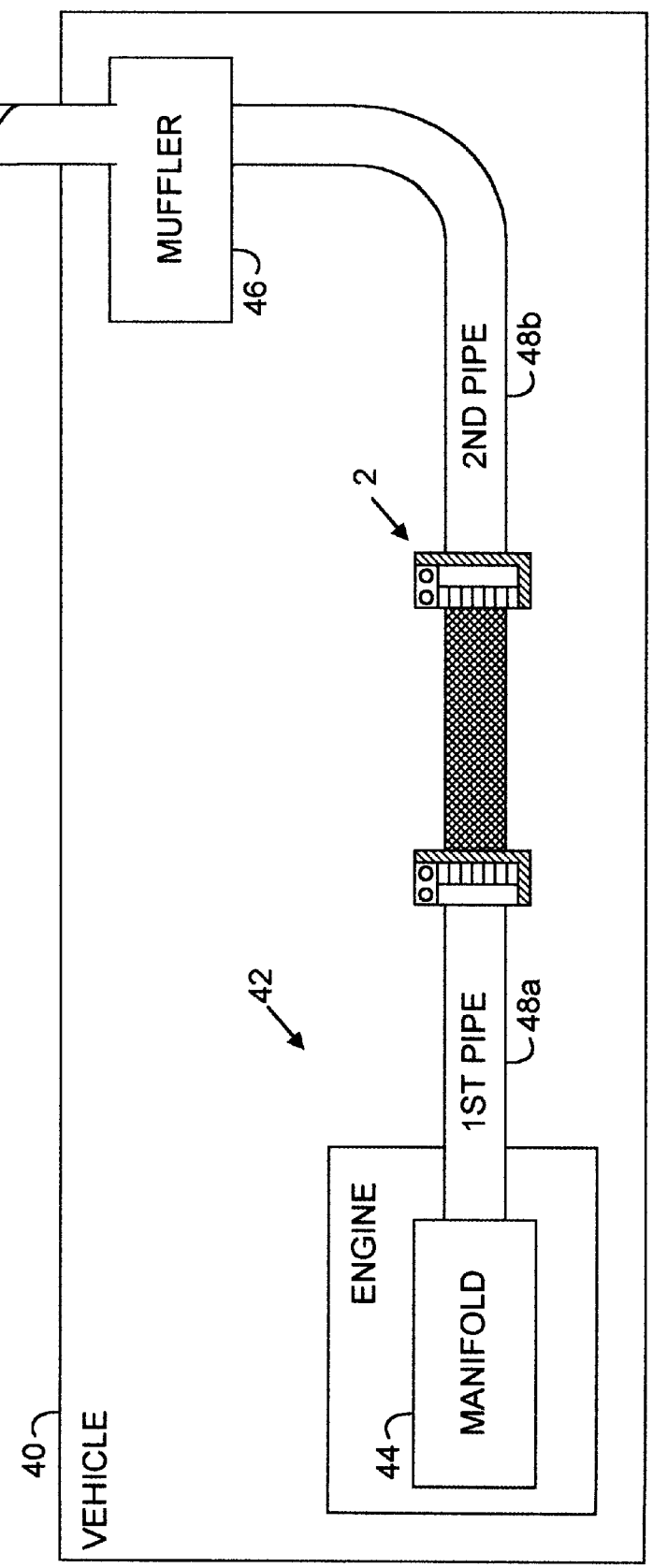
FIG. 2 is a schematic block diagram of a vehicle with an exhaust system having first and second exhaust system component pipes connected by the coupling assembly of the present invention.

FIG. 2 is a schematic block diagram of a vehicle 40 with an exhaust system 42 having first and second exhaust system components, such as an exhaust manifold 44 and a muffler 46. The exhaust manifold 44 and the muffler 46 have first and second exhaust system pipes 48a,b which are interconnected by the coupling assembly 2 embodying the present invention.

It is to be understood that while certain forms of the present invention have been illustrated and described herein, it is not to be limited to the specific forms or arrangement of parts described and shown.

What is claimed and desired to be secured by Letters Patent is as follows:

1. A clamp comprising:
   a) an annular band forming first and second rims and a receiver extending between and open at said rims;
   b) said band having first and second sections located adjacent to said first and second rims respectively;
   c) said first section having a generally circular cross-sectional configuration;
   d) said second section having a generally polygonal cross-sectional configuration;
   e) said band having first and second ends; and
   f) a connector sub-assembly connected to said band ends and adapted for selectively expanding and contracting said receiver.

2. The clamp according to claim 1 which includes:
   a) each said band section occupying approximately one half of the width of said band.

3. The clamp according to claim 1 wherein said band first section includes a plurality of radially-spaced, longitudinally-extending flat sides.

4. The clamp according to claim 1, which includes:
   a) said connector subassembly including first and second plates mounted on said band first and second ends respectively; and
   b) a mechanical fastener extending through said plates and adapted for drawing same closer together or releasing same further apart.

5. A coupling assembly for connecting first and second pipe ends, which comprises:
   a) a flexible metal hose coupling, which includes:
      1) a spiral-wound metal strip with interlocking leading and trailing edges;
      2) first and second ends;
      3) a coupling bore extending between and open at said ends, said coupling bore being adapted to receive said first and second pipe ends at said first and second coupling ends respectively; and
      4) a generally polygonal cross-sectional configuration; and
   b) a pair of clamps each including:
      1) an annular band forming first and second rims and a receiver extending between and open at said rims;
      2) said band having first and second sections located adjacent to said first and second rims respectively;
      3) said first section having a generally circular cross-sectional configuration;
      4) said second section having a generally polygonal cross-sectional configuration;
      5) said band having first and second ends; and
      6) a connector sub-assembly connected to said band ends and adapted for selectively expanding and contracting said receiver.

6. The coupling assembly according to claim 5, which includes:
   a) said coupling bore having an inside diameter greater than an outside diameter of said first and second pipes.

7. The coupling assembly according to claim 5, which includes:
   a) said polygonal cross-sectional configuration of said coupling body being adapted to resist expansion and contraction of said coupling body bore by resisting longitudinal slippage of said strip winding turns with respect to each other along said interlocking strip edges.

8. The clamp according to claim 5 which includes:
   a) each said band section occupying approximately one half of the width of said band.

9. The clamp according to claim 5 wherein said band first section includes a plurality of radially-spaced, longitudinally-extending flat sides.

10. The clamp according to claim 9, which includes:
   a) said connector subassembly including first and second plates mounted on said band first and second ends respectively; and
   b) a mechanical fastener extending through said plates and adapted for drawing same closer together or releasing same further apart.

11. In combination with a vehicle exhaust system including an vehicle exhaust system with first and second exhaust system component pipes having first and second pipe ends respectively, the improvement of a coupling assembly which comprises:
   a) a flexible metal hose coupling, which includes:
      1) a spiral-wound metal strip with interlocking leading and trailing edges;
      2) first and second ends;
      3) a coupling bore extending between and open at said ends, said coupling bore being adapted to receive said first and second pipe ends at said first and second coupling ends respectively; and
      4) a generally polygonal cross-sectional configuration; and
   b) a pair of clamps each including:
      1) an annular band forming first and second rims and a receiver extending between and open at said rims;
      2) said band having first and second sections located adjacent to said first and second rims respectively;
      3) said first section having a generally circular cross-sectional configuration;
      4) said second section having a generally polygonal cross-sectional configuration;
      5) said band having first and second ends; and
      6) a connector sub-assembly connected to said band ends and adapted for selectively expanding and contracting said receiver.

* * * * *